Sept. 9, 1941.  L. V. HARE  2,255,705
APPARATUS FOR INSPECTING CROWN CAPS
Filed Sept. 14, 1940  2 Sheets-Sheet 1
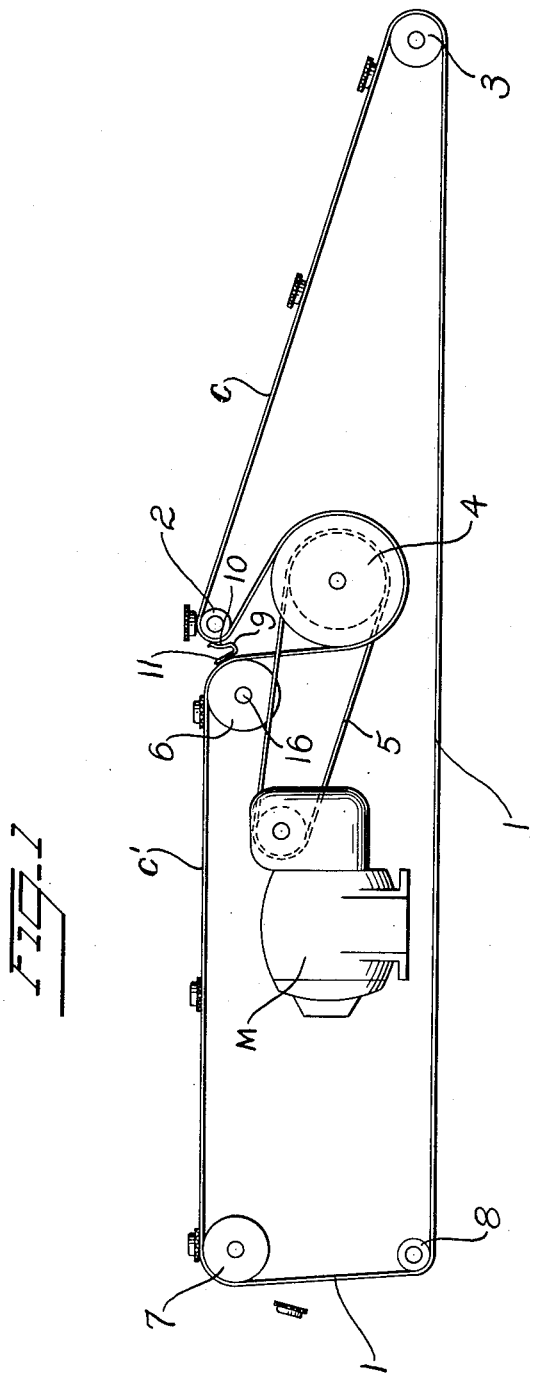
INVENTOR.
Lawrence V. Hare
BY Mason & Porter
ATTORNEYS.

Sept. 9, 1941. L. V. HARE 2,255,705
APPARATUS FOR INSPECTING CROWN CAPS
Filed Sept. 14, 1940 2 Sheets-Sheet 2
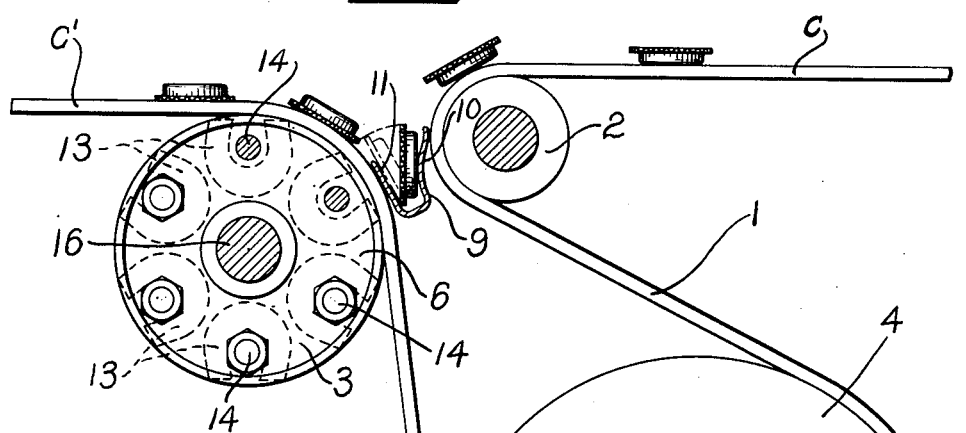
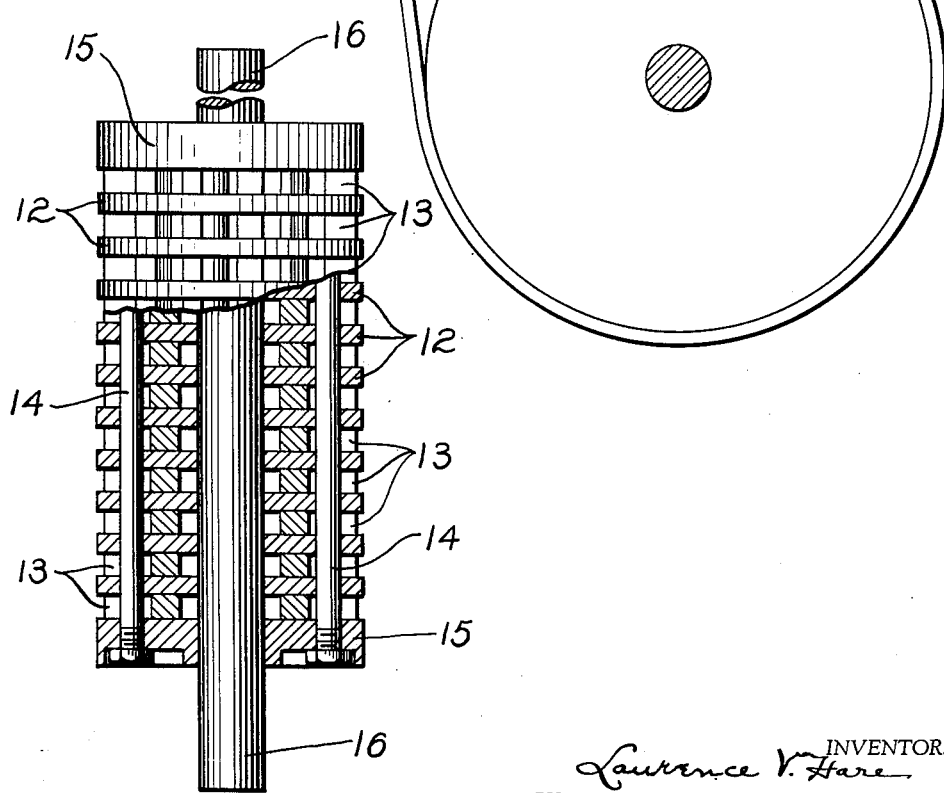
INVENTOR.
Laurence V. Hare
BY Mason + Porter
ATTORNEYS.

Patented Sept. 9, 1941

2,255,705

UNITED STATES PATENT OFFICE 2,255,705

APPARATUS FOR INSPECTING CROWN CAPS

Laurence V. Hare, Baltimore, Md., assignor to Continental Can Company, Inc., New York, N. Y., a corporation of New York Application September 14, 1940, Serial No. 356,848

1 Claim. (Cl. 198—33)

The invention relates to apparatus for conveying caps for containers so that they may be inspected and caps having imperfections removed.

An object of the invention is to provide a conveying apparatus with means for turning the caps over so as to enable both sides to be inspected.

A further object of the invention is to provide an apparatus of the above type wherein a plurality of rows of traveling caps may be inspected at the same time.

A still further object of the invention is to provide an apparatus of the above type wherein the caps are turned on edge by gravity and then carried by magnets to a reversed horizontal position for inspection.

These and other objects will in part be obvious and will in part be hereinafter more fully described.

In the drawings which show by way of illustration one embodiment of the invention—

Figure 1 is a diagrammatic side view of the inspection belt with the magnetic turnover.

Fig. 2 is a vertical sectional view taken through the center of the magnetic pulley, deflector trough and conveyor belt assembly, and Fig. 3 is a view partially in section of the magnetic pulley for turning the caps.

In the making of crown caps, it is customary to insert in the metal cap a cork insert and to apply to the inner face of the cork insert a disk of metal or the like which will prevent the contents of the container from contacting with the cork. The metal cap is lacquered and is often decorated on the outer face. These caps have to be carefully inspected to see that the spotting disk attached to the cork is properly centered so that it will serve the purpose of preventing the contents of the container from contacting with the cork, and at the same time leave a sufficient portion of the cork exposed for contact with the sealing lip of the container. The caps also have to be carefully inspected to see that during the handling of the metal caps in the machines operating to insert the cork inserts and apply the spots, the lacquer has not been marred or scratched so as to render the cap defective. During the operation of inserting the cork and the applying of the spot, the cap is supported with the inner side thereof facing upward, and they are, therefore, discharged from the machine with the cork insert and the spot facing upward. In order that the outer face of the cap may be inspected, it has to be turned over.

The purpose of the present invention is to provide a conveying mechanism which receives the caps from the spotting machine, which conveying mechanism is so constructed that the caps are conveyed for a short distance with the cork insert and spot face-side upward for inspection, and then turned over and conveyed for a short distance with the outer face of the cap upward so that the operators positioned along the conveyor may inspect both the inner and outer faces of the cap and remove any caps which are defective.

The drawings show more or less diagrammatically a conveying apparatus which includes conveyor sections which are separated from each other by a turn-over device so that the caps on one section of the conveyor are positioned for inspection of the cork insert and spot, while on the other section of the conveyor, the caps are positioned for the inspection of the outer face of the cap.

As illustrated, a conveyor 1 runs over pulleys 2 and 3, thus providing a conveyor section C on which the caps are received from the spotting machine (not shown) and which carries the caps for a distance so that the operators standing alongside of the conveyor can inspect the caps and remove any which are defective. The conveyor after it leaves the pulley 2 runs over a driving pulley 4 which is operated by a motor M through a suitable transmitting device 5. The conveyor after leaving the pulley 4 runs over a pulley 6 and then a pulley 7. This provides a horizontal section C' on which the caps are carried with the upper face uppermost so that the operators standing alongside of the conveyor can inspect the cap to see whether the lacquer is scratched or marred, or the decorations imperfect so as to create a defective cap.

The conveyor runs over an idler 8 and thence to the pulley 3. This conveyor belt is of considerable width and the caps to be inspected may be delivered from the machine either in a single row or in a plurality of rows, and the caps properly inspected on both sides thereof and the defective caps removed. Located between the conveyor sections C and C' is a device for turning the caps over. This device is in the form of a trough 9. There is a space between the pulleys 2 and 6 and the trough is located in this space. The trough has an upstanding portion 10 which lies at its upper end close to the path of travel of the conveyor as it leads over the pulley 2. It also has an upstanding portion 11 which extends close to the path of travel of the conveyor as it leads over the pulley 6. The caps carried by the conveyor section C will be discharged into this turnover trough as shown in Fig. 2 of the drawings.

The pulley 6 consists of fiber board sections 12 and magnets 13 which are placed between the fiber disks. As shown in Fig. 2, there are six magnets 13 between the fiber disks, and these are arranged so that the poles of the magnets are at the periphery of the pulley. Clamping bolts 14 extend through brass end disks 15, 15, and thus the fiber disks and magnets are firmly clamped together forming the pulley 6 over which the conveyor runs. The conveyor engages the fiber disks and the magnetic poles are very close to the under face of the conveyor. This pulley 6 is mounted on a shaft 16 and is rotated by the conveyor contacting therewith.

The conveyor is preferably made of canvas or other non-magnetic material. The caps are discharged by the conveyor section C into the trough and come within the influence of the magnetic forces of the magnets so that the caps are drawn face down against the conveyor belt and thus lifted from the trough. When the conveyor belt leaves the pulley, it is in horizontal position and the caps are turned over so that the lacquered or decorated face thereof is uppermost. It is understood that the turn-over trough 9 extends from one side of the belt to the other, and therefore, a plurality of caps may be discharged into the turn-over trough at the same time and will be turned over and removed therefrom by the conveyor section C' of the belt together with the aid of the magnetic pulley.

It will be understood that the conveyor sections C and C' may be independent of each other instead of connected and operated as one. The essential feature consists in providing a conveying section which is of sufficient length to permit the caps to be inspected on one face thereof and then delivered to a turn-over device from which they are taken by the other section for inspection.

While the invention is described as applied to the inspection of caps for containers having cork inserts and spots, it will be understood that the inspecting apparatus may be used for the inspection of various types of closures or other parts which must be viewed from both the upper and lower faces thereof for defects.

It is obvious that many changes may be made in the details of construction and in the arrangement of the parts without departing from the spirit of the invention as set forth in the appended claim.

Having thus described the invention, what I claim as new and desire to secure by Letters Patent, is:

An apparatus for the inspection of container caps comprising two inspection conveyor sections arranged in tandem and substantially in alignment, one of which delivers caps to the other, pulleys spaced from each other over the adjacent faces of which said conveyor sections pass, a device disposed between the pulleys and the conveyor sections thereon for receiving the caps from the first section on edge, and magnets associated with the pulley over which the second section runs for lifting the caps from said device onto the second conveyor section reverse side up, said conveyor sections being dimensioned so as to carry a plurality of rows of caps.

LAURENCE V. HARE.